May 2, 1967 L. W. COULSON ETAL 3,316,806

PORTABLE PROJECTOR

Filed Jan. 13, 1964 2 Sheets-Sheet 1

INVENTORS
LEONARD W. COULSON
ECKART F. SCHULTZE
JOSEPH ANTOS
BY Bayard H. Michael
ATTORNEY May 2, 1967

L. W. COULSON ET AL 3,316,806

PORTABLE PROJECTOR

Filed Jan. 13, 1964

INVENTORS
LEONARD W. COULSON
ECKART F. SCHULTZE
JOSEPH ANTOS

BY *Bayard H. Michael*

ATTORNEY

United States Patent Office 3,316,806
Patented May 2, 1967

3,316,806
PORTABLE PROJECTOR
Leonard W. Coulson, Slinger, Wis., Joseph Antos, Big Rock, Ill., and Eckart F. Schultze, Oconomowoc, Wis., assignors to La Belle Industries, Inc., Oconomowoc, Wis., a corporation of Wisconsin
Filed Jan. 13, 1964, Ser. No. 337,304
6 Claims. (Cl. 88—28)

This invention relates to projectors and, more particularly, to portable projectors. However, it will be appreciated that, although various aspects of this invention are particularly adapted to portable projectors, they may also find application in other types of projectors.

A number of problems have restricted the development of a completely acceptable portable projector and underlying some of these problems has been the limited power available from the battery source used to achieve portability from an electrical standpoint. For example, one such problem has been to provide adequate light with available power and, furthermore, to harmonize power requirements from a light standpoint with the other power requirements of the projector and to achieve this while remaining within the limits of portability. In the area of providing adequate light, turning to larger rated projection lamps has not been a satisfactory answer for the reasons that the increase in size of the lamps is restricted by the limited power available, the size of the power source cannot be increased such that it works against portability and, moreover, using larger rated lamps does not result in a corresponding increase in available light. Contrary to this approach of increasing the size of the power source or turning to higher rated projection lamps, it has been discovered that adequate light for projection purposes can be achieved by using a standard lamp and operating it above rated voltage. For example, it has been discovered that by utilizing a standard 10-volt lamp and operating it from a voltage source of approximately 11–12 volts, sufficient light intensity is generated for projection purposes, the light intensity having been observed to be markedly higher than that resulting from operating an 11-volt lamp at 11 volts. It has further been discovered that although operating a standard lamp over its rated voltage has an adverse effect on its useful life, this is not detrimental in a projector application since the normal life of a projection lamp is approximately 25 hours whereas the normal life of a standard lamp is 125 hours so that, even through the life of a standard lamp is reduced, it may still exceed that of a projection lamp. Thus adequate light can be achieved with a workable power source and one which can readily be made to accommodate the other power requirements of the projector and all within acceptable limits for portability.

Accordingly, an object of this invention is to increase the available light intensity in a portable projector; and to achieve this while harmonizing the other power requirements of the projector.

A recognized, desirable characteristic of a portable projector is that it be compact and this invention has for another of its objects the provision of a compact portable projector. In some applications, such as use as a sales aid or for display purposes where the projector may be moved from place to place between showings without sufficient time or opportunity for re-wind or it may be necessary to have successive showings with a minimum of time between showings, it is desirable that the portable projector be capable of continuous operation with a minimum of attention. Accordingly, another object of this invention is to provide a portable projector which can perform continuously with no break in operation for rewind operations or the like; and, furthermore, to do so with a construction which maintains a compact projector construction.

Another object of this invention is to provide an improved step drive for a projector.

The novel features of this invention are set forth in the appended claims. The invention itself, together with additional objects and advantages thereof, will be more clearly understood from a reading of the following description in connection with the accompanying drawings wherein a preferred embodiment of this invention is illustrated and in which:

Figure 1:
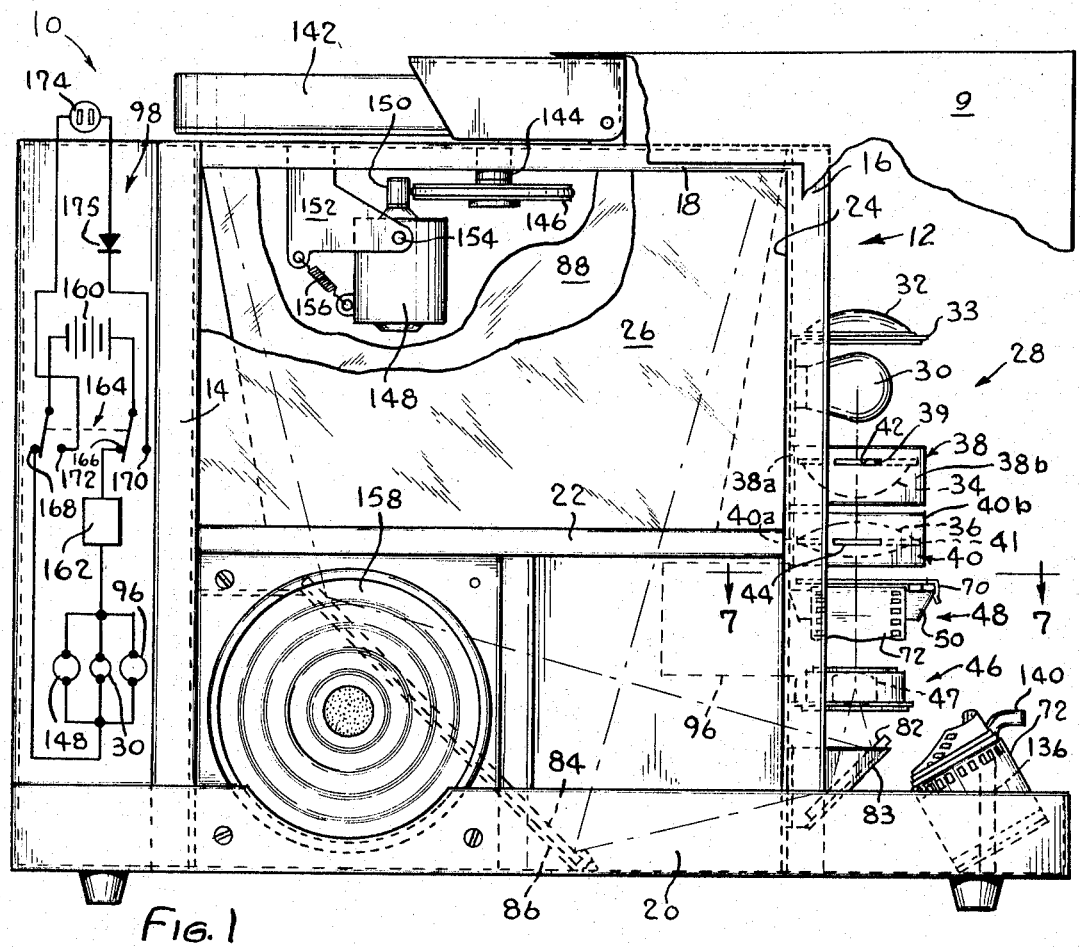
FIG. 1 is a front elevation of the projector with parts broken away and with the power supply illustrated schematically.
Figure 6:
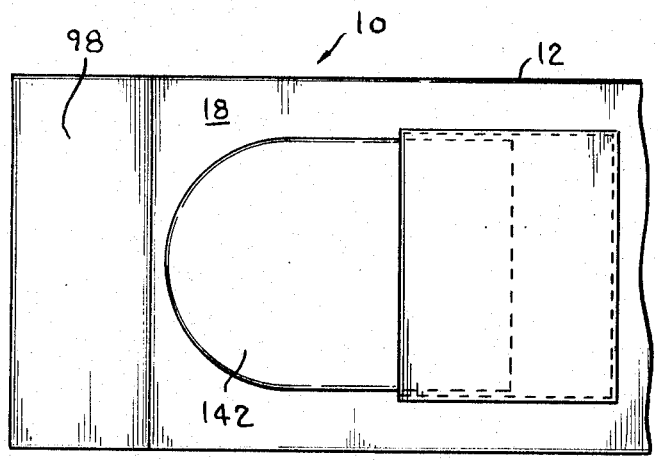
FIG. 6 is a partial top view of the projector.
Figure 7:
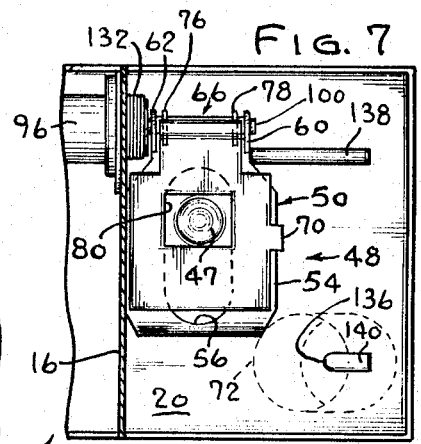
FIG. 7 is a section view generally along line 7—7 of FIG. 1.

Projector 10 is illustrated with only a portion of its outer housing 9 to expose its interior and includes central portion 12 defined by a frame having opposed vertical side brackets 14 and 16 connected across the top by support plate 18 and having their lower ends connected to bottom 20 of the projector. Cross member 22 extends between side brackets 14 and 16 at approximately the midpoint of the brackets to define opening 24 in which a suitable projection screen 26 is disposed. The outer projector housing (not shown) is provided with a suitable aperture arranged to register with opening 24 to expose screen 26.

Projection means 28 is disposed to one side of central section 12 with the elements making up the projection means supported from side bracket 16. More particularly, a lamp 30 is connected in a suitable socket (not shown) mounted in side bracket 16. A dished reflector 32 is connected to bracket 16 by an angle bracket 33 and is supported adjacent lamp 30 and, as is well known in the art, has a suitable polished or silvered inner surface (not shown). Condenser lenses 34 and 36 are supported in alignment with lamp 30 and reflector 32 by separate, generally U-shaped brackets 38 and 40 which are fixed to bracket 16. Reflector 32 is arranged relative to lamp 30 to direct light from the lamp downwardly along a desired line and onto the condenser lenses which can have any desired configuration depending upon the particular application. Base portions 38a and 40a of the brackets are fixed to bracket 16 and lens edges 39 and 41 are engaged in pairs of aligned slits 42 and 44 in bracket arms 38b–38c and 40b–40c. The bracket arms are somewhat resilient to positively hold the lenses in position while permitting ready assembly and disassembly thereof and, being separate from each other, any variance in the diameter of the respective lenses will not result in an increase in stress nor in a loose mounting for one of the condenser lenses.

Projection lens assembly 46 including lens 47 is supported on bracket 16 in alignment with the lamp, reflector and condenser lenses. Film strip support means 48 is positioned between the condenser and projection lenses and includes a lower support bracket 50 having a vertical portion 52 attached to bracket 16 and a generally horizontally extending portion 54 provided with an elongated slit 56. The forward end 57, the left end in FIG. 2, of support bracket 50 is turned downwardly to facilitate entrance of the film strip to the film strip support and the rear end 58, the right end in the drawings, is provided with a pair of up-turned arms 60 and 62 which support a film drive sprocket assembly 66. The film strip support also includes upper plate 68 adapted to extend over lower plate 50 and is held in position relative to the lower plate by a spring clip 70, release of spring clip 70 permitting movement of plate 68 to clear film strip 72 for removal or for threading. As viewed in FIG. 2, the right end 74 of plate 68 is generally arcuate and will guide the film strip into engagement with sprocket wheels 76 and 78 of the film sprocket assembly 66. Upper plate 68 is also provided with an aperture 80 which is aligned with elongated aperture 56 of bracket 50 and also with the lamp, reflector and condenser and projection lenses. Aperture 80 is rectangular to conform generally to a film frame and provides a film aperture.

A mirror 82 is supported from bracket 16 by bracket 83 in alignment with the lamp, film aperture and lenses. Mirror 82 is supported at an angle with respect to the line of projection of the lamp and film strip and is part of a reflecting means including a second mirror 84 supported in central section 12 of the projector by bracket 86 and receives a reflected picture from mirror 82. From mirror 84 the picture is reflected upwardly onto a third mirror 88 supported at an angle behind projection screen 26, mirror 88 having its lower end engaged in a bracket 90 and its upper end resting against support plate 18 of the frame. Lamp 30 is connected to a suitable power source to be described more particularly hereinafter and, with this arrangement, when it is energized it projects a picture through lens 47 and through reflection means onto projection screen 26.

Film strip 72 preferably comprises a number of separate picture frames, the strip being threaded between upper and lower support brackets 50 and 63 of the film strip support means 48 with tabs 92 and 94 arranged between the support brackets to provide clearance for the film strip. From the support brackets, the film strip passes to and is threaded over sprockets 76 and 78 adapted to pull the film strip past aperture 80. The film sprocket assembly is driven by electric motor 96 which is controlled by the power source 98, to be described hereinafter, in such a manner as to step the film strip past the film aperture, in other words, a film frame is positioned at the film aperture and is allowed to remain at the aperture for a predetermined time after which the motor 96 steps the drive sprocket to advance the film strip one frame to position another picture at the film aperture.

Figure 3:
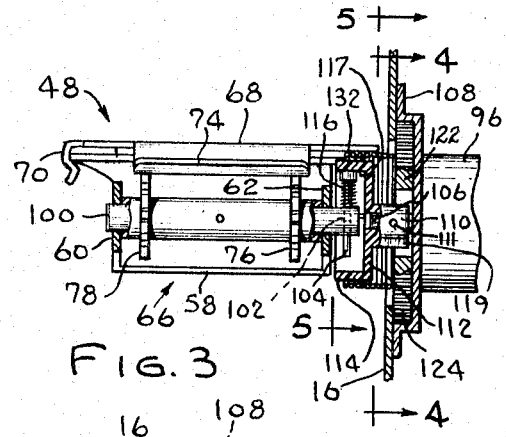
FIG. 3 is a section view generally along line 3—3 of FIG. 2.
Figure 4:
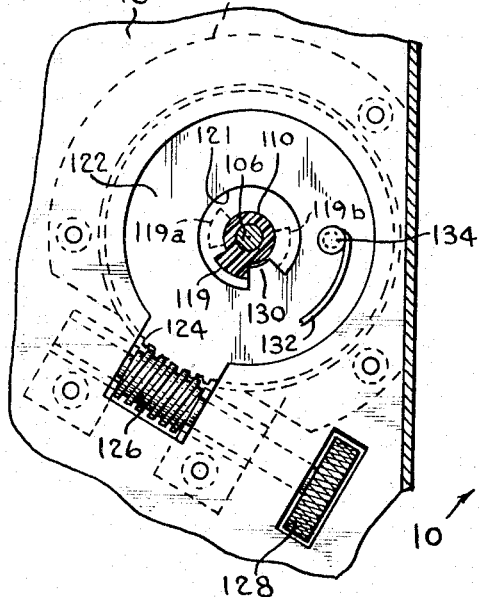
FIG. 4 is a section view generally along line 4—4 of FIG. 3.
Figure 5:
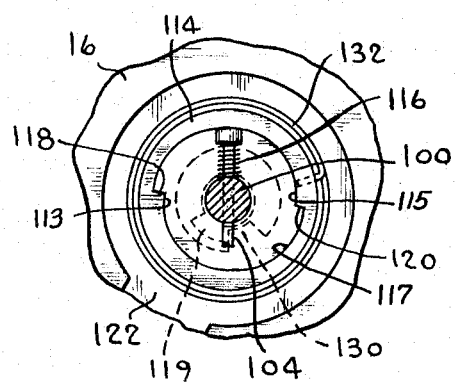
FIG. 5 is a section view generally along line 5—5 of FIG. 3.

The drive for film sprocket assembly 66 will be more specifically described with reference to FIGS. 3, 4 and 5. The assembly includes a sprocket shaft 100 supported in arms 60 and 62 of support bracket 50. The right end of shaft 100 is provided with a diametrically arranged through hole 102 for receipt of a pin 104. Drive shaft 106 of motor 96 extends through a motor mounting bracket 108 into hub 110 of a driving member 112. A drive connection is provided between shaft 106 and hub 110 by pin 111 (see FIG. 3) so that member 112 is rotatable with the motor drive shaft. Driving member 112 and pin 104 provide a one-way drive clutch for the film advance. More particularly, driving member 112 includes a generally cylindrical shroud 114 which extends over pin 104, and pin 104 is biased outwardly by a compression spring 116 toward and engages the inner surface 117 of the shroud. The inner surface of shroud 114 includes cam rises 113 and 115 terminating in radial cam drops 118 and 120 which are diametrically opposed and spaced approximately 180° apart. Hub 110 includes a radial key portion 119 disposed for rotation in opening 121 provided in a plate 122 (see FIG. 4). Plate 122 has gear teeth 124 formed on its outer periphery and engaged by worm 126 of adjusting screw 128 so that plate 122 can be rotated in bracket 108 for a purpose which will be described hereinafter; however, for the purposes of the description of the film advance drive the plate 122 is, and can be, considered as being stationary with respect to sprocket assembly 66. That is, after having been properly adjusted plate 122 is then stationary with respect to the sprocket wheel, which consists of shaft 100 and arms 60 and 62, during operation of the drive. Plate 122 includes a radially inwardly projecting portion 130 which is positioned in the path of rotation of key portion 119. Energization of motor 96 rotates shaft 106 and driving member 112, this engages one of the faces provided by the radial cam drops 118 and 120 with pin 104 to rotate sprocket shaft 100 until key portion 119 of hub 110 engages stop 130 at which point motor 96 stalls and film movement is terminated. Driving member 112 is connected to plate 122 by coil spring 132, the coil spring being seated on a post 134 fixed to plate 122 and suitably connected to shroud 114 of the driving member. When driving member 112 is rotated to drive the sprocket shaft, spring 132 is deformed to exert a biasing force on the shroud tending to return it to its rest position, FIG. 5. When motor 96 stalls and the energizing signal removed therefrom, spring 132 returns shroud 114 to its normal position. The spring biased pin 104 and shroud 114 act in the nature of a ratchet, or one-way drive to permit movement of the sprocket assembly to advance the film strip and also to permit return movement of the driving member to its normal position for another step without disturbing the sprocket assembly and correspondingly without disturbing the film strip.

Figure 2:
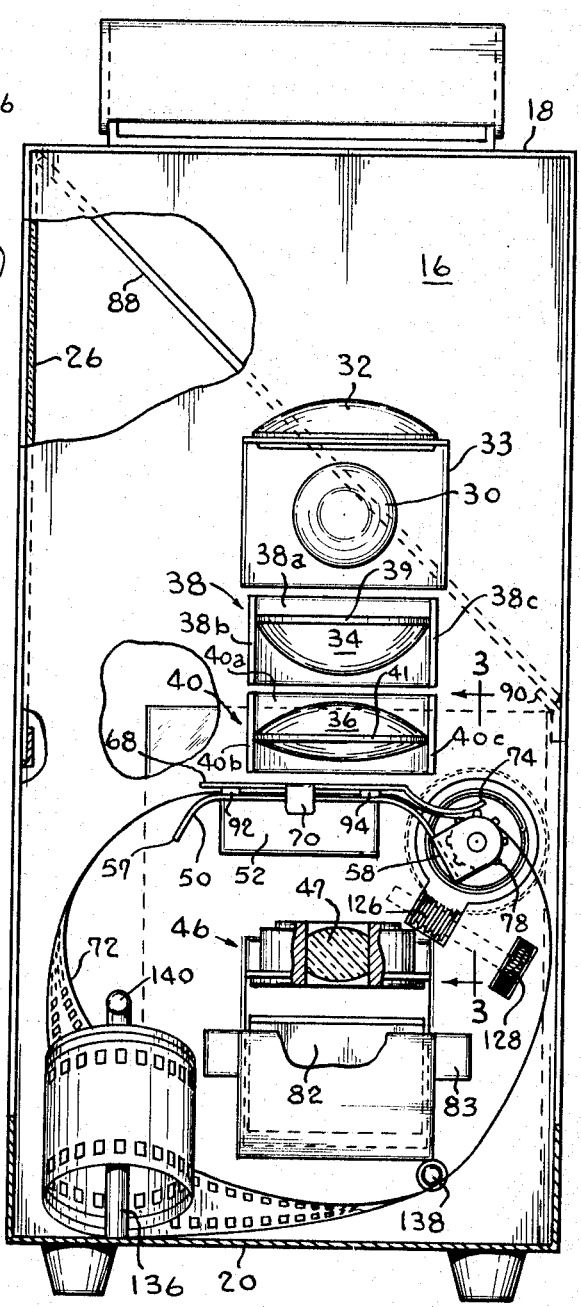
FIG. 2 is a side elevation of the projector with parts broken away.

The advantage of this drive arrangement is that it insures identical, uniform steps each time the drive motor is pulsed while permitting the freedom of film strip adjustment necessary to properly position the film frames with respect to the film aperture. More particularly and relating this film advance drive to a particular application, assuming the sprocket drive wheels to be provided with eight teeth as illustrated in FIG. 2 and assuming four film holes per picture frame, the film sprocket must be stepped 180° to advance the film one frame. As illustrated in FIG. 4 the solid line showing of key portion 119 illustrates its position at the start of a drive step. Assuming clockwise rotation, it will be noted that radial cam face 118 is positioned approximately 90° from the head of pin 104 and, therefore, there will be approximately 90° lost motion between driving member 112 and pin 104 before pin 104 is engaged for driven movement. During this lost motion, key portion 119 will have moved to dotted line position 119a of FIG. 4. The sprocket shaft will then be rotated until key portions 119 engages stop 130, dotted line showing 119b. It will be noted that the driven movement from position 119a to position 119b is approximately 180°, accordingly, pin 104 and sprocket shaft 100 will have been driven 180° to advance the film strip one frame. When key portion 119 engages stop 130 sprocket 66 will be stopped, motor 96 will stall and when power to motor 96 is removed, spring 132 will rotate the driving member in a counterclockwise direction to return it and key portion 119 to their normal position, that illustrated in FIGS. 4 and 5, where it is ready for a subsequent step.

Adjusting screw 128 provides adjustment of the film strip to align the film frames with the film aperture. Rotation of screw 128 will rotate driving member 112 to engage pin 104 and thereafter driving member movement moves the film strip through the film support. This provides manual adjustment of the film frame or the initial step of the film strip can be adjusted by varying the lost motion between pin 104 and the radial cam faces. More particularly, rotating plate 122 either moves the driving member against or frees it for movement by the bias of spring 132. This varies the initial position of cams and pin and will vary the initial step but, since the driving member is moved the same amount with each step, all subsequent steps will be 180°. This adjustment of the initial step can be repeated until the film is properly framed.

The film strip is in the form of a continuous roll supported on post 136 which is fixed to bottom 20 of the projector. As the film strip leaves the drive sprockets it is threaded over guide roller 138 and onto post 136 in the form of a roll. Post 136 is provided with a turned end 140 to hold the film roll against vertical movement. Post 136 is laterally offset from the line of projection of lamp 30, the lenses and film aperture so that a continuous roll of film can be utilized and fed from the inside of the roll to film support means 48 without interference with the projection or unduly complicating film support. A continuous roll fed from the inside of the roll provides for continuous projector operation for at the end of a particular showing the film is arranged for a subsequent showing without the necessity of any rewind operation. More particularly, as the film strip passes from guide roller 138 it is wound on the outside of the film roll, whereas film is drawn from the inside of the roll by the drive sprocket.

Projector 10 is also provided with mechanism for providing sound with the film showing. More particularly, a tape cartridge assembly 142 is connected on top support bracket 18. A drive spindle 144 for the tape cartridge extends through top support bracket 18 into the interior of projector 10 and is connected to and rotatable with a driven wheel 146. Electric drive motor 148, preferably a governed-speed motor for optimum sound reproduction, is provided with a friction disk 150 which engages the periphery of wheel 146 to transmit rotation to the driven wheel. Motor 148 is pivotally supported from bracket 152 on pin 154 with coil spring 156 connected between bracket 152 and motor 148 to bias the motor in a clockwise direction to insure adequate pressure between friction disk 150 and driven wheel 146. Tape cartridge 142 can be constructed in any well-known manner and is suitably connected to a speaker assembly 158 connected between bracket 22 and bottom 20 of the projector and faces the front of the projector. In a manner well known in the art and not shown, the tape in cartridge 142 is fed to the sound heads from the inside of the tape roll so that continuous operation of the tape can be had similar to that of film strip 72 to preserve the continuous operation of the overall projector.

Lamp 30, drive motor 96 for the film advance and drive motor 148 for the tape mechanism are suitably connected for energization from a power supply. More particularly and with reference to FIG. 1, power supply module 98 is illustrated in outline in FIG. 1 and is preferably disposed on the side of central section 12 opposite to that of projection means 28. The power supply circuit is illustrated schematically on the outline showing of the power supply module and includes a power source 160 comprising a number of batteries. The batteries are connected in circuit with a suitable amplifier control 162 and, through the amplifier control, are connected with lamp 30 and drive motors 96 and 148. The construction and operation of the amplifier is conventional and in a conventional manner is synchronized with the tape to provide continuous energization of lamp 30 and drive motor 148 and pulse motor 96 at the proper time to advance the film. The connection of the batteries 160 to the amplifier and the motor and lamp is achieved through a double throw switch 164 and, as illustrated in FIG. 1, the switch blades are in engagement with contacts 166 and 168 to connect the batteries in circuit with the projector lamp and motor. Nickel cadmium batteries are preferably used in source 160 so that it can recharge when connected to a suitable external source. To recharge the batteries double throw switch 164 is moved from contacts 166 and 168 into engagement with contacts 170 and 172 to connect the batteries for connection, through rectifying means 175, to a suitable A.C. source 174. It will be appreciated that A.C. source 174 does not form a part of the power module but can be any A.C. outlet and that the connection between switch 164 and the outlet can be made through a suitable well-known plug construction. It will also be appreciated that the projector constructed in accordance with this invention is not limited to the particular electrical power supply circuit illustrated but, for example, could also incorporate a power supply circuit such as that disclosed and claimed in the co-pending application of Milton E. Koch for an "A.C.-D.C. Power Supply," filed Dec. 23, 1963, Ser. No. 332,428, and assigned to the assignee of this application.

To provide sufficient light intensity for projection purposes and to maintain a simple power source and projector construction, this invention proposes to operate lamp 30 above its rated voltage. It has been observed that operating the lamp above rated voltage achieves a marked, visible increase in light intensity. A projection-type lamp could be used as the light source and operated over rated voltage to achieve an increase in light output or intensity, however, operating over rated voltage shortens lamp life which, in the case of a projection lamp, is undesirable as it results in such a short life that use of the projection lamp is not preferred. As a solution to this problem, namely to achieve increase light intensity with an acceptable lamp life, it is proposed to utilize a standard lamp. Although operating over rated voltage has an adverse effect on the life of the standard lamp it is not dertimental in a projector application since a standard lamp exhibits a normal life of approximately 125 hours whereas a projection lamp has a life of approximately 25 hours so that, even if reduced, the life of a standard lamp may still exceed that of a projector lamp and be acceptable for use in a projector. As an example of a particular application, preferably a 10.8 volt 3 amp lamp is used and operated from a power source comprising nine 1¼ nickel cadmium batteries to provide approximately 11.2 volts. This combination of lamp and power source is preferred as it provides optimum light intensity within the limits of portability and the light produced is visibly greater than that produced by operating an 11-volt lamp at 11 volts. It has been discovered that projection operation can be further optimized by utilizing a 10–12 volt D.C. motor for driving the film advance (motor 96), a 10–12 volt governed-speed D.C. motor for the tape drive (motor 146) and an amplifier also adapted to operate in the 10–12 volt range. Although other combinations of power source, lamp, motors and amplifier could be used within the broad scope of this invention, the above specific example of power source lamp, motors and amplifier is preferred as it provides optimum operating characteristics without sacrificing the size, weight, compactness and simplicity of design necessary to an acceptable portable projector design. Furthermore, nine 1¼ volt batteries provide approximately one hour of continuous showing which is sufficient to accommodate normal usage of the projector for sales, promotional and display purposes.

Although but one embodiment of the present invention has been illustrated and described, it will be apparent to those skilled in the art that various changes and modifications may be made therein without departing from the spirit of the invention or from the scope of the appended claims.

What we claim is:
1. A portable audio-visual projector comprising, in combination,
    a housing having a base, a vertical wall extending from said base, and a projection screen arranged at and visible through an opening in the vertical wall of said housing,
    horizontally disposed lamp means within said housing characterized by having a predetermined rated voltage at which said lamp means will have an optimum operating life,
    reflector means in said housing operatively adjacent and above said lamp means for directing light from said lamp means along a desired vertical line,
    film support means defining a film aperture on said line and supporting a film roll to be fed past said film aperture, lens means arranged along said line between said lamp means and film aperture, a self-contained D.C. power supply within said housing, connected to said lamp means, and characterized by supplying power to operate said lamp means above its rated voltage so that sufficient light is emitted from said lamp means with the relatively limited power available from said self-contained D.C. power supply, drive means connected to said D.C. power supply and said film roll for moving said film past said aperture, a sound system connected to and operated from said D.C. power supply, and means controlling said lamp means, drive means and sound system.

2. The combination of claim 1 wherein said D.C. power supply comprises rechargeable batteries and said power supply includes means for selectively connecting said D.C. power supply to operate said projector and to an external A.C. source to recharge said batteries.

3. The combination of claim 1 wherein said film support means also includes post means spaced laterally from said line and film aperture and extending in a direction generally parallel to said line, said film roll being continuous and supported on said post means, the film of said roll passing from the inside of said roll to said film aperture and returning to the exterior of said roll so that said projector is continuously operable without interruption for film rewind and said film roll support means does not interfere with projection along said line.

4. The combination of claim 1 wherein said drive means includes motor means, driven means connected to said film and operative, when driven, to move said film past said film aperture, driving means connected to and driven by said motor means in one direction, means biasing said driving means in an opposite direction, one of said driving and driven means comprising a cam surface having radial cam drops spaced apart a predetermine distance and the other of said driving and driven means including a member biased toward said cam surface, and including stop means arranged to limit movement of said driving means, said biased member normally assuming a position between and spaced from said radial cam drops to provide lost motion between said driving and driven means, and means for adjusting the relative position of said biased member and said radial cam drops.

5. The combination of claim 1 wherein said lamp means, reflector means and lens means are aligned along said vertical line to one side of said projection screen, and including a first reflecting mirror arranged on said line, a second mirror arranged behind said projection screen and a third mirror arranged intermediate said first and second mirrors to reflect an image from said first mirror to said second mirror and onto said projection screen.

6. The combination of claim 1 wherein said lamp means exhibits optimum lamp life when operated at approximately 10.8 volts, said drive means for said film roll includes a 10–12 volt D.C. motor as a source of motive power, said sound system includes tape means and a 10–12 volt governed speed D.C. motor for driving said tape means, and said D.C. power provides 10–12 volts D.C. to said lamp means and said motors and further characterized by providing approximately 11.2 volts to said lamp means so that said lamp means is operated above its optimum life voltage.

References Cited by the Examiner

UNITED STATES PATENTS

| | | | |
|---|---|---|---|
| 1,264,520 | 4/1918 | Holmes | 240—10.66 |
| 1,653,743 | 12/1927 | Stegmann | 88—24 |
| 1,897,283 | 2/1933 | Templeton | 352—128 |
| 1,949,892 | 3/1934 | Wright | 88—24 X |
| 2,060,560 | 11/1936 | Ellis | 88—24 |
| 2,186,049 | 1/1940 | Thompson | 88—24 |
| 2,424,945 | 7/1947 | Pierce | 352—126 X |
| 2,693,127 | 11/1954 | Ortman. | |
| 3,028,790 | 4/1962 | Wade et al. | 88—28 |
| 3,059,527 | 10/1962 | Krasny | 352—173 |
| 3,187,626 | 6/1965 | Mindell et al. | 352—31 X |
| 3,192,378 | 6/1965 | Oldenburger | 240—10.65 |
| 3,206,090 | 9/1965 | Foret | 226—51 |

JULIA E. COINER, *Primary Examiner.*